F. W. YOUNG.

Seed-Droppers.

No. 5,529. Reissued August 5, 1873.

*Witnesses*
John A. Ellis
Edward E. Ellis

*Inventor*
Frank W. Young
By
T. H. Alexander & Co.
Attys.

AM. PHOTO-LITHOGRAPHIC CO. N.Y. (OSBORNE'S PROCESS)

UNITED STATES PATENT OFFICE.

FRANK W. YOUNG, OF HOLDEN, MISSOURI.

IMPROVEMENT IN SEED-DROPPERS.

Specification forming part of Letters Patent No. 135,743, dated February 11, 1873; reissue No. 5,529, dated August 5, 1873; application filed June 25, 1873.

*To all whom it may concern:*

Be it known that I, FRANK W. YOUNG, of Holden, in the county of Johnson and State of Missouri, have invented certain new and useful Improvements in Seed-Droppers; and I do hereby declare that the following is a full, clear, and exact description thereof, references being had to the accompanying drawings and to the letters of reference marked thereon, which form a part of this specification.

The nature of my invention consists in the construction and arrangement of an improved seed-dropper for corn-planters, which is simple in construction and reliable in operation, and so arranged that the size of the dropping apertures may be conveniently adjusted to any desired extent, according to the amount of seed required to be dropped at a time, as will be hereinafter more fully set forth.

In order to enable others skilled in the art to which my invention appertains to make and use the same, I will now proceed to describe its construction and operation, referring to the annexed drawing, in which—

Figure 1:
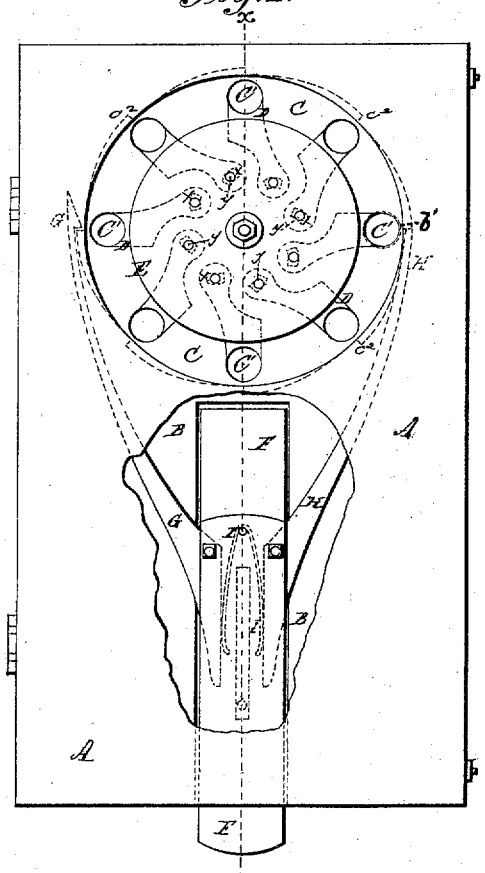
Figure 2:
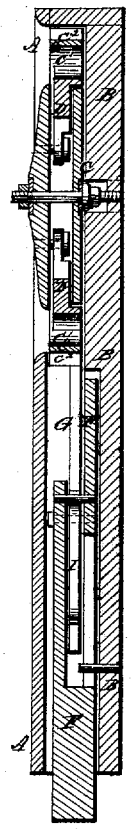
Figure 3:
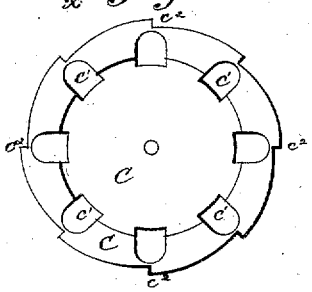
Figure 4:
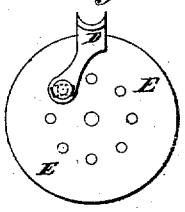

Figure 1 is a plan view of my seed-dropper, partly in section. Fig. 2 is a detail section of the same taken through line *x x*, Fig. 1. Fig. 3 is a detail view of the lower or main part of the dropping device, and Fig. 4 is a detail view of the under side of the upper disk and one of the adjustable arms.

A B are two boards which form the bottom of a seed-hopper, and between which is placed a wheel, C, pivoted at its center to the lower board B. In the upper board A is formed a round hole of such a size that the edge of said board A may slightly overlap the upper edge of the wheel C, so that the seed may rest upon the board A and wheel C, but cannot get into the space between the boards A and B. Through the wheel C, near its outer edge, is formed a circle of holes or slots, $c^1$, the outer parts of which are semicircular. The upper ends of the holes $c^1$ are open, so as to receive seed from the hopper, and their lower ends are closed by the board B, so that the seed cannot escape from the said holes until each hole $c^1$ comes successively over a hole, $b'$, in the board B, through which its escapes to the ground. The middle part of the upper side of the wheel C is recessed to receive the arms D, which are made in about the form shown in Figs. 1 and 4, and are pivoted to the under side of the disk E, so that they may be drawn inward or pushed outward by turning the disk E in one or the other direction. The inner end of each arm D is provided with a slot, *x*, as shown in Fig. 1, and a pin, *y*, from the disk E passes through said slot. The outer ends of the arms are concaved, and enter the inner ends of the holes $c^1$, so that the said holes or dropping apertures may be enlarged or diminished by the inward or outward movement of the arms D. The disk E is placed upon the pivot of the wheel C, and, when adjusted, is clamped to said wheel C by a nut screwed upon the upper end of said pivot, thus holding the arms D firmly in the position to which they have been adjusted by the turning of the disk. Upon the edge of the wheel C are formed as many ratchet-teeth $c^2$ as there are dropping-holes $c^1$ in the wheel, as shown in Figs. 1 and 3. F is a sliding bar, to which a reciprocating movement is given in the ordinary manner and by the ordinary means. The end of the bar F enters a guide-groove in the space between the boards A B, and to it are pivoted two pawls, G H. The forward end of the pawl G has a hook formed upon it to take hold of the ratchet-teeth $c^2$ of the wheel C, and turn said wheel as the bar F is moving outward. The forward end of the other pawl H is so formed as to take hold of the ratchet-teeth of the wheel C as the bar F is moved inward. The movement of the bar F is so adjusted that the wheel C, at each movement of said bar F, will be turned a distance equal to the space between two adjacent holes, $c^1$. The forward or engaging ends of the pawls G H are held against the wheel C by a U or other spring, I, placed between the other or rear ends of said pawls, as shown in Fig. 1.

Having thus fully described my invention, what I claim as new, and desire to secure by Letters Patent, is—

1. The slotted and pivoted arms D D, when used in connection with a rotating dropping-wheel, substantially as and for the purpose set forth.

2. The combination of the slotted pivoted arms D D with disk E, substantially as and for the purpose set forth.

3. The slotted pivoted arms D D and pivoted disk E, in combination with the pivoted wheel C, provided with dropping-holes $c^1$, substantially as described, and for the purpose set forth.

4. The reciprocating slide F, pawls G H, dropping-wheel C, disk E, and arms D D, all constructed and combined to operate substantially in the manner and for the purpose herein described.

In testimony that I claim the foregoing as my own I affix my signature in presence of two witnesses.

FRANK W. YOUNG.

Witnesses:
J. L. BOWER,
JAS. H. ROGERS.